(12) United States Patent
Sasaki et al.

(10) Patent No.: US 6,463,195 B1
(45) Date of Patent: Oct. 8, 2002

(54) METHOD OF MANUFACTURING POLARIZATION-MAINTAINING OPTICAL FIBER COUPLER

(75) Inventors: Hideki Sasaki; Ryozo Yamauchi, both of Sakura; Hiroshi Hidaka, Yotsukaido; Kenji Nishide, Sakura; Shigefumi Yamasaki, Sakura; Ryokichi Matsumoto, Sakura; Yoji Suzuki, Yachiyo, all of (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 09/578,271

(22) Filed: May 25, 2000

(30) Foreign Application Priority Data

May 31, 1999 (JP) .......................................... 11-153080

(51) Int. Cl.$^7$ .............................. G02B 6/26; G02B 6/42
(52) U.S. Cl. .......................................... 385/43; 385/48
(58) Field of Search ............................... 385/43, 27–30, 385/48

(56) References Cited

U.S. PATENT DOCUMENTS 4,932,740 A * 6/1990 Berkey et al. ................ 385/43
5,024,501 A * 6/1991 Taya et al. ..................... 385/43
5,420,949 A * 5/1995 Arima et al. .................. 385/43
5,689,578 A * 11/1997 Yamauchi et al. ........... 385/123

FOREIGN PATENT DOCUMENTS

| JP | SHO 62-30602 | 7/1987 |
| JP | Hei 2-271307 | 11/1990 |
| JP | 2649271 | 9/1997 |

* cited by examiner

*Primary Examiner*—Hemang Sanghavi
*Assistant Examiner*—Scott Knauss
(74) *Attorney, Agent, or Firm*—Chadbourne & Parke, LLP (57) ABSTRACT

In a method of manufacturing a polarization-maintaining optical fiber coupler by heating lengthwise portions of two polarization-maintaining optical fibers extending side by side, and elongating the heated portions to thereby form a fused-elongated section, elongation is terminated when the cyclic changes in a coupling ratio of two polarized waves according to an elongation length at a wavelength in use are both within first two cycles, so that the coupling ratio of one of the polarized waves is equal to or less than 10% and the coupling ratio of the other one of the polarized waves is equal to or greater than 90%. This method can provide a polarization-maintaining optical fiber coupler whose coupling ratio has a large dependency on polarization with a short elongation length.

13 Claims, 8 Drawing Sheets

SHORTEST DISTANCE BETWEEN CENTERS
OF TWO NORMALIZED CORES

A (X OUTPUT)
B (Y OUTPUT)

BOTH POLARIZATION INPUTS

METHOD OF MANUFACTURING POLARIZATION-MAINTAINING OPTICAL FIBER COUPLER

BACKGROUND OF THE INVENTION

1. Field of the Invention

The present invention provides a novel polarization-maintaining optical fiber coupler which is useful in the optical fiber communication field, the field of sensors using optical fibers and the like, and which couples and branches lights while maintaining the polarization of light in optical fibers. This application claims the priority of Japanese Patent Application No. 11-153080, which is incorporated herein by reference.

2. Description of the Related Art

The mode of light is comprised of an X polarized wave and Y polarized wave. A device which can couple and branch those polarized waves is called a polarization beam splitter (hereinafter abbreviated to "PBS"). A PBS is useful, for example, in a fiber optic gyro which measures the angular velocity using, for example, the interference of light or in coupling and branching lights from a light source which has linear polarization. To realize the characteristics of a PBS, the X polarized wave and Y polarized wave should have different coupling characteristics.

Proposed as such an optical device is a polarization-maintaining optical fiber coupler which uses polarization-maintaining optical fibers.

Various kinds of polarization-maintaining optical fibers have been proposed so far, and a typical known one is a PANDA (Polarization maintaining AND Absorption reducing) fiber.

Figure 12:
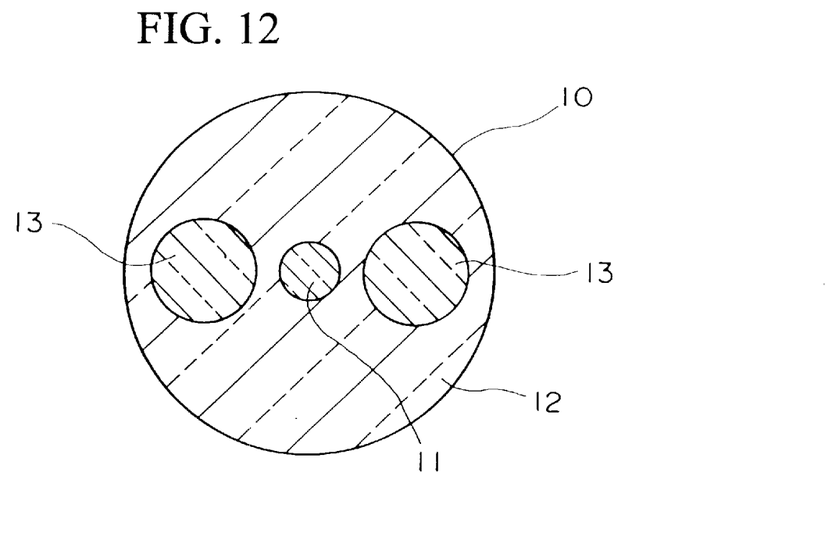
FIG. 12 is a cross-sectional view exemplifying a PANDA fiber.

FIG. 12 exemplifies a PANDA fiber. This PANDA fiber 10 comprises a core 11 provided at the center, a cladding 12 provided concentrical to the core 11 and having a lower refractive index than that of the core 11, and two stress applying sections 13 arranged in the cladding 12 symmetrically to each other around the core 11 and having a circular cross section and a lower refractive index than the cladding 12.

In this example, the core 11 is formed of germanium-doped quartz glass, the cladding 12 is formed of pure quartz glass, and each stress applying section 13 is formed of quartz glass in which a relatively large amount of boron is doped. The outside diameter of the core 11, the outside diameter of the stress applying section 13, the relative refractive-index difference between the core 11 and the cladding 12, and the relative refractive-index difference between the cladding 12 and the stress applying section 13 are adequately set in accordance with the desired characteristics. The outside diameter of the cladding 12 is normally set to approximately 125 μm.

The stress applying section 13 has a larger coefficient of thermal expansion than the cladding 12. In the process where the optical fiber drawn at the time of production is cooled, strain originated at the stress applying section 13 is applied to the fiber's cross section.

This strain produces anisotropic strain with respect to the core 11, clearing the degeneracy of polarized waves so that the propagation constant of the X polarized wave differs from that of the Y polarized wave. Naturally, the distributions of the electromagnetic fields of those polarized waves differ from each other. This provides the characteristic such that the X polarized wave and Y polarized wave are maintained while propagating.

Figure 13:
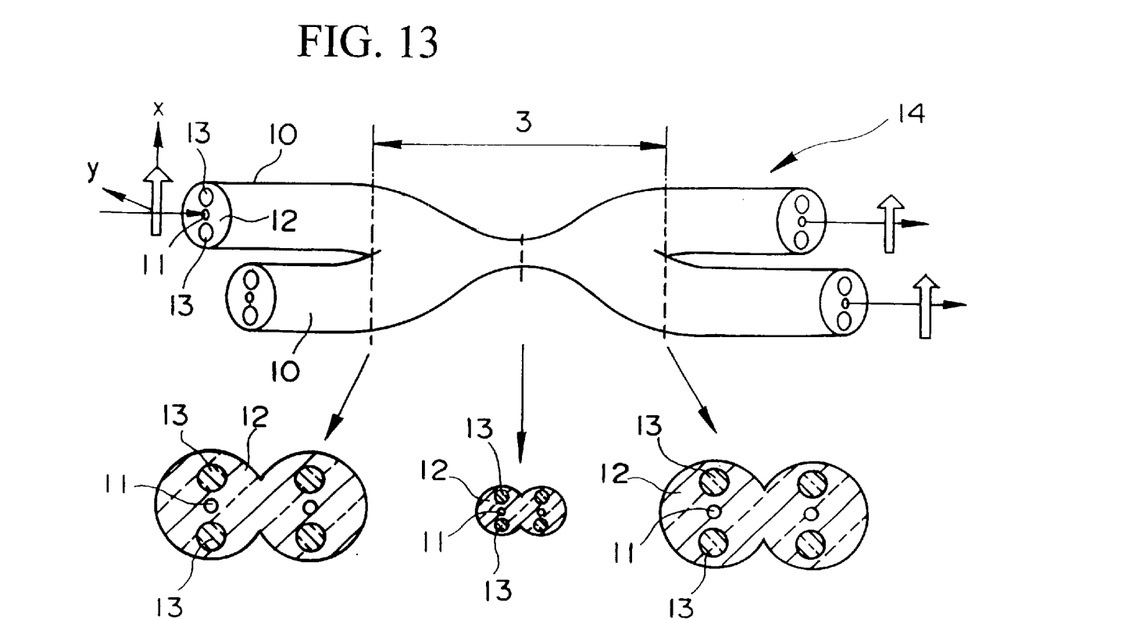
FIG. 13 is an explanatory diagram exemplifying a polarization-maintaining optical fiber coupler.

FIG. 13 exemplifies a polarization-maintaining optical fiber coupler. This polarization-maintaining optical fiber coupler 14 has two PANDA fibers 10 arranged side by side in such a way that their axes of polarization become parallel to each other. The PANDA fibers 10 are heated and melted with claddings 12 midways of the PANDA fibers 10 and are elongated in the lengthwise direction, thus forming a fused-elongated section (optical coupling section) 3. Note that the axis of polarization is the line in each PANDA fiber 10 that passes the center between the stress applying sections 13.

In this polarization-maintaining optical fiber coupler, the X polarized wave propagates while maintaining the electric field vector in the direction of the polarization axes of the PANDA fibers 10, while the Y polarized wave propagates in the PANDA fibers 10 while maintaining the electric field vector in the direction perpendicular to the direction of the former electric field vector. The X polarized wave and Y polarized wave are coupled or branched at the fused-elongated section 3 at a midway.

According to the conventional polarization-maintaining optical fiber coupler, the difference between the coupling ratio of the X polarized wave and that of the Y polarized wave can be provided by making long the elongation length, namely the length by which the optical fiber (PANDA fiber 10) is to be elongated at the time the fused-elongated section 3 is formed. This difference can provide the conventional polarization-maintaining optical fiber coupler with the characteristics of a PBS.

Figure 14A:
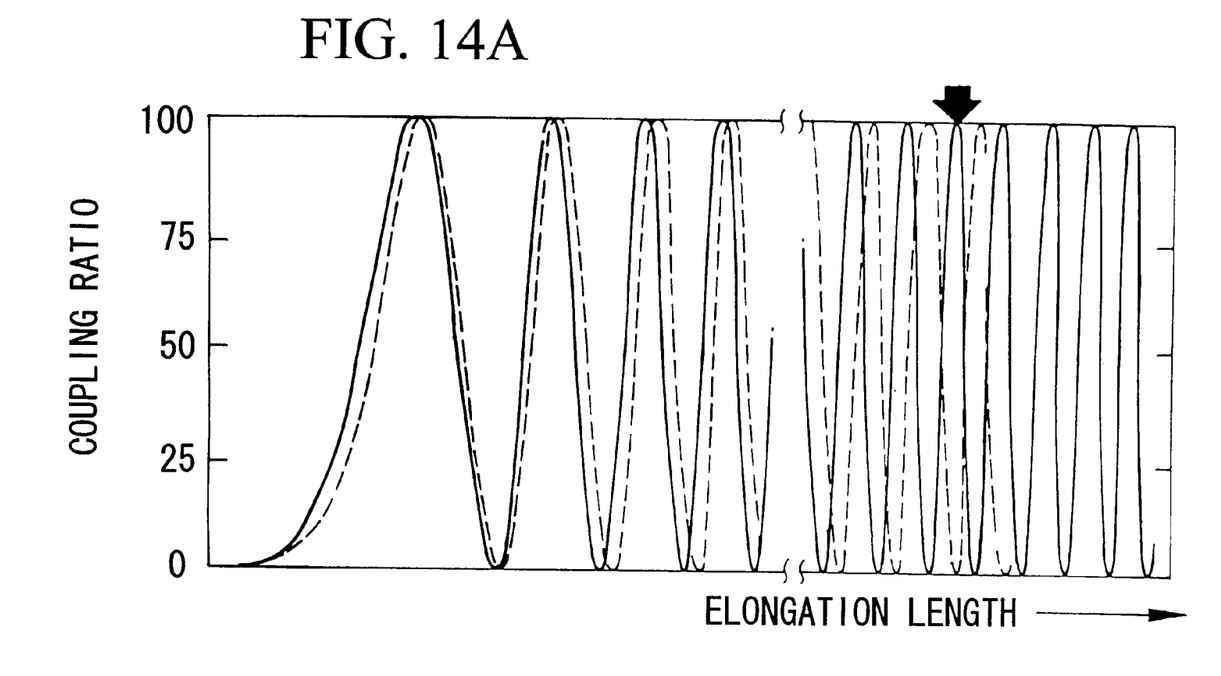
FIG. 14A is a graph showing the relationship between the elongation length and the coupling ratio.

FIG. 14A is a graph showing the relationship between the elongation length and the coupling ratio of light having a wavelength in use. The broken line represents the coupling characteristic of the X polarized wave, and the solid line the coupling characteristic of the Y polarized wave.

Forming the fused-elongated section of the conventional polarization-maintaining optical fiber coupler involves the repetition of an operation of coupling both the X polarized wave and Y polarized wave from one polarization-maintaining optical fiber (first optical fiber) to the other polarization-maintaining optical fiber (second optical fiber), further proceeding elongation to thereby transfer (couple) both polarized waves to the first optical fiber, and then transferring the polarized waves to the second optical fiber.

In forming the fused-elongated section 3 using ordinary polarization-maintaining optical fibers, the coupling of the Y polarized wave is slightly larger than the coupling of the X polarized wave, thus providing a slight difference between the cyclic changes (transfer cyclic changes) in the coupling ratios of the Y polarized wave and the X polarized wave. For the sake of convenience, one cycle is taken as a change in the coupling ratio which starts increasing from 0%, reaches 100%, then decreases to 0%, and two cycles are simply the repetition of one cycle twice.

When the elongation length becomes longer and the number of cycles becomes several cycles to several tens of cycles, the difference between the coupling ratios of the X polarized wave and the Y polarized wave becomes larger. If the fused-elongated section 3 is formed, elongated to the vicinity of the point where the difference in the coupling ratio indicated by the thick arrow in the graph becomes large, it is possible to acquire the characteristics of a PBS such that when the X polarized wave and Y polarized wave of the wavelength in use are input from the input-side port which is comprised of the same fiber as an output-side port A, the X polarized wave is output from the output-side port A and the Y polarized wave is output from the other port B.

The conventional polarization-maintaining optical fiber coupler however suffers the problem of the long device length needed to couple and branch the X polarized wave and the Y polarized wave. With the use of a polarization-maintaining optical fiber having an outside diameter of 125 µm, for example, the elongation length would become more than 60 mm and would become as long as about 100 mm in some cases.

This long length makes the fused-elongated section very thin and inevitably reduces the mechanical strength and requires reinforcement. However, reinforcement is difficult to achieve because attaching a reinforcing member to the fused-elongated section alters the optical characteristics.

In addition, the wavelength band that permits coupling and branching of the X polarized wave and Y polarized wave is extremely narrow, for example, as narrow as about 10 nm.

SUMMARY OF THE INVENTION

Accordingly, it is an object of the present invention to provide a polarization-maintaining optical fiber coupler which has a shorter fused-elongated section than the conventional one and whose coupling ratio has a large dependency on polarization.

It is another object of this invention to provide a polarization-maintaining optical fiber coupler which can improve the mechanical strength.

It is a further object of this invention to provide a polarization-maintaining optical fiber coupler having a polarization dependency which can be used over a wide wavelength band.

To achieve the above objects, according to one aspect of this invention, there is provided a method of manufacturing a polarization-maintaining optical fiber coupler, which comprises the steps of heating lengthwise portions of two polarization-maintaining optical fibers extending side by side; and elongating the heated portions to thereby form a fused-elongated section, wherein elongation is terminated when the cyclic changes in a coupling ratio of two polarized waves according to an elongation length at a wavelength in use are both within first two cycles, so that the coupling ratio of one of the polarized waves is equal to or less than 10% and the coupling ratio of the other one of the polarized waves is equal to or greater than 90%.

This invention has the following advantages.

This invention can provide a polarization-maintaining optical fiber coupler whose coupling ratio has a large dependency on polarization with a short elongation length. It is therefore effective to use this polarization-maintaining optical fiber to prepare a PBS.

The short elongation length can permit the polarization-maintaining optical fiber coupler to have a large mechanical strength. Further, it is possible to reduce the number of times the X polarized wave or Y polarized wave is coupled from one polarization-maintaining optical fiber to the other one (the number of transfer times), thus resulting in a low loss.

Furthermore, this invention can provide a polarization-maintaining optical fiber coupler whose coupling ratio has a large polarization dependency over a wide wavelength band. It is therefore possible to provide a PBS effective in preparing an optical circuit which, for example, simultaneously separates light of multiple wavelengths to different polarized waves or couple polarized waves.

It is also possible to provide a polarization-maintaining optical fiber coupler with a smaller excess loss by using polarization-maintaining optical fibers which have a large diameter A.

DETAILED DESCRIPTION OF THE PREFERRED EMBODIMENTS

Figure 1:
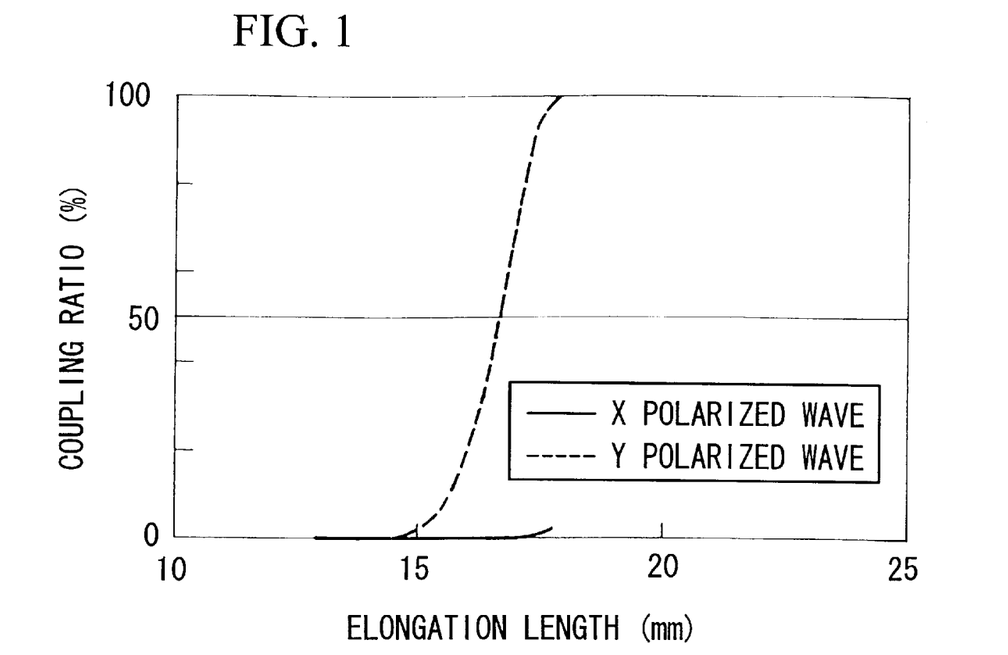
FIG. 1 is a graph showing the relationship between the elongation length and the coupling ratio of a polarization-maintaining optical fiber coupler according to a first embodiment.

FIG. 1 is a graph showing the relationship between the elongation length at the time of forming a fused-elongated section and the coupling ratio of light with a wavelength of 1550 nm (used wavelength) according to the first embodiment.

The polarization-maintaining optical fibers used in this embodiment are PANDA fibers that have the following characteristics.

(Characteristics of PANDA Fibers)

| | |
|---|---|
| Core diameter | 6.5 μm |
| (core radius) | (3.25 μm) |
| Cladding diameter | 125 μm |
| Core-cladding relative refractive-index difference | 0.35% |
| Outside diameter of stress applying section | 35 μm |
| Distance between centers of stress applying sections | 55 μm |
| Diameter A | 20 μm |
| Used wavelength | 1550 nm |
| Mode birefringent index at used wavelength | $4 \times 10^{-4}$ |

The minimum diameter of the fused-elongated section of the obtained polarization-maintaining optical fiber coupler is 61 μm, the aspect ratio is 1.89 and the elongation length is 17.8 mm. The aspect ratio is the ratio of the maximum outside diameter of the center portion of the fused-elongated section to the minimum outside diameter thereof (maximum outside diameter/minimum outside diameter).

The characteristics of this polarization-maintaining optical fiber coupler are shown in Table 1 below.

TABLE 1

| | | |
|---|---|---|
| Excess loss | X polarized wave | 0.12 dB |
| (1550 nm) | Y polarized wave | 0.33 dB |
| Coupling ratio | X polarized wave | 0.9% |
| (1550 nm) | Y polarized wave | 99.2% |
| 90% band of Y polarized wave | | 58 nm |
| 15% band of X polarized wave | | 1600 nm or lower |

As mentioned above, in forming the fused-elongated section, as the elongation length gets longer, the change in the coupling ratio which increases from 0%, reaches 100%, then returns to 0% is repeated for both the X polarized wave and Y polarized wave.

According to this invention, the fused-elongated section is formed by heating and melting two polarization-maintaining optical fibers in such a way that the cores of the two polarization-maintaining optical fibers do not come close to each other to the greatest extent possible (in such a way that the distance between the centers of the cores does not becomes too small). This can provide a large difference between the coupling ratios of the X polarized wave and Y polarized wave from the point at which the coupling ratios start increasing.

As a result, as shown in FIG. 1, elongation is stopped for the Y polarized wave at the point in time (½ cycle) at which the coupling ratio has reached 100% for the first time since the coupling ratio increased, and elongation is stopped for the X polarized wave at the point in time when the coupling ratio increases very little. This can permit the fused-elongated section to be formed in such a manner that, for example, only the Y polarized wave is coupled from one polarization-maintaining optical fiber to the other one and the X polarized wave is hardly coupled.

Figure 2:
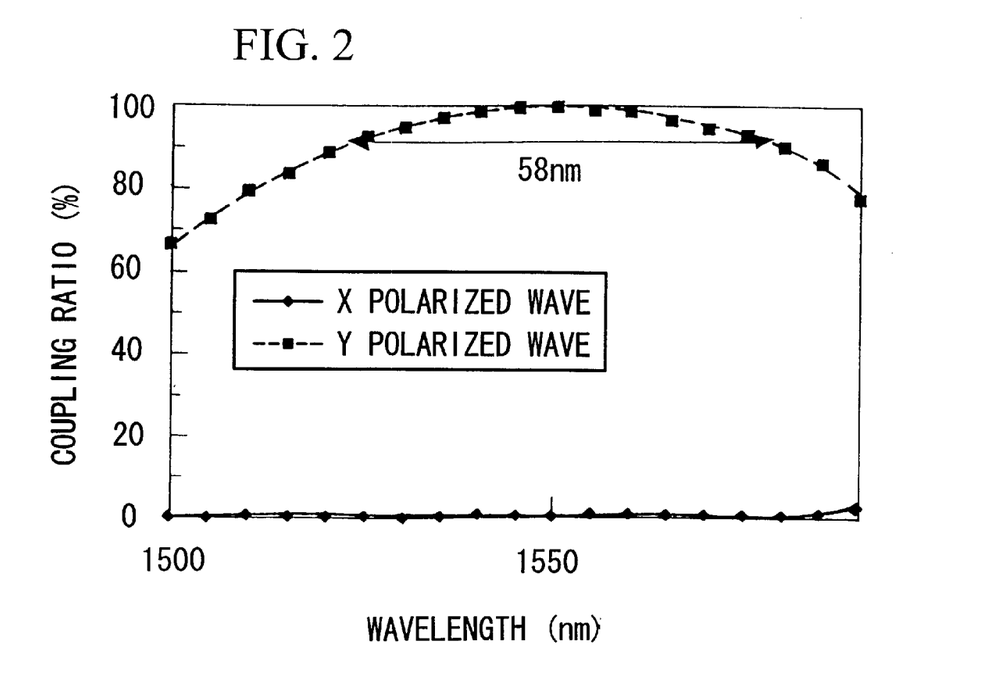
FIG. 2 is a graph depicting the relationship between the wavelength and the coupling ratio of the polarization-maintaining optical fiber coupler according to the first embodiment.

Adjusting the degree of closeness of two cores at the fused-elongated section this way can provide a sufficient difference between the coupling ratios of the X polarized wave and Y polarized wave over a wide wavelength range as shown in FIG. 2.

In this example, the wavelength range over which the coupling ratio of the Y polarized wave is equal to or greater than 90% and the coupling ratio of the X polarized wave is equal to or smaller than 10% is 58 nm which is very wide. Because the coupling ratio of the X polarized wave rises slightly on the long wavelength side, the dependency of the X polarized wave on the wavelength is smaller on the short wavelength side.

In the production of a specific fused-elongated section, it is preferable to set such heating conditions as to permit easy maintenance of the outward form of two polarization-maintaining optical fibers so that the centers of the cores of those two optical fibers do not come too close to each other. One feasible way is to set the temperature of the heating source, such as a burner, lower than the conventional temperature. Another way is to increase the distance from the heating source. Further, elongation may be carried out quickly so as to reduce the amount of heat per unit time.

Actually, light of the used wavelength is input from the input-side port and heating and elongation are carried out while monitoring the lights that emitted from two ports on the output side, and the work is terminated when the desired coupling ratio is acquired.

Figure 3:
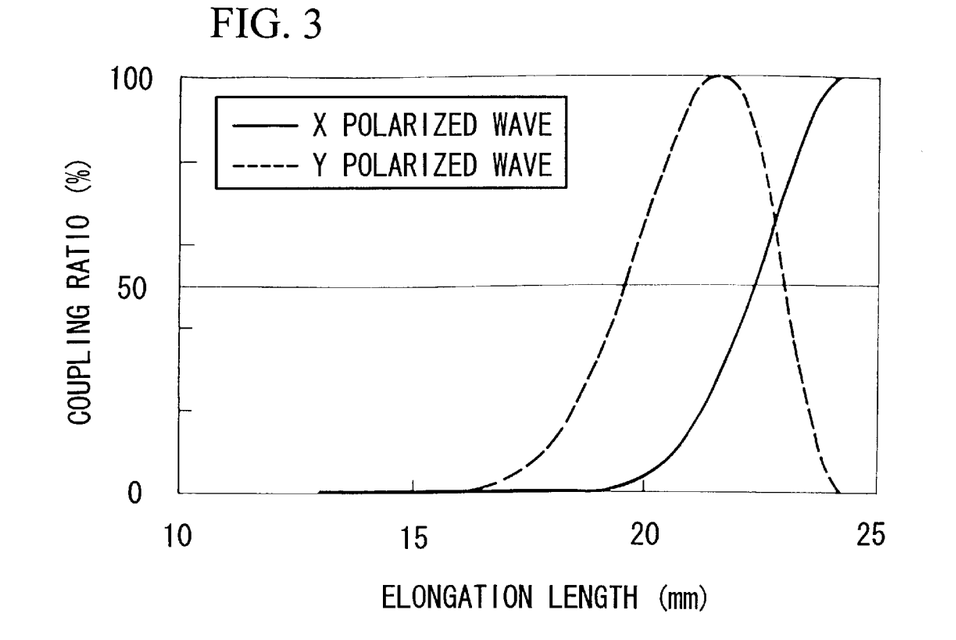
FIG. 3 is a graph showing the relationship between the elongation length and the coupling ratio of a polarization-maintaining optical fiber coupler according to a second embodiment.

FIG. 3 presents a graph showing the relationship between the elongation length at the time of forming a fused-elongated section and the coupling ratio of light with a wavelength of 1550 nm (used wavelength) according to the second embodiment.

In the second embodiment, as in the first embodiment, the fused-elongated section is formed by heating and melting two polarization-maintaining optical fibers in such a way that the cores of the two polarization-maintaining optical fibers do not come close to each other to the greatest extent possible. This permits the distance between the centers of the two cores to be kept at the fused-elongated section and provides a large difference between the coupling ratios of the X polarized wave and Y polarized wave from the point at which the coupling ratios start increasing.

In the second embodiment, as shown in FIG. 3, elongation is stopped for the Y polarized wave at the point of time (1 cycle) where the coupling ratio increased and has reached 100% once and then decreased and has reached 0%. For the X polarized wave, elongation is stopped at the point of time (½ cycle) when the coupling ratio has reached 100% for the first time.

Figure 4:
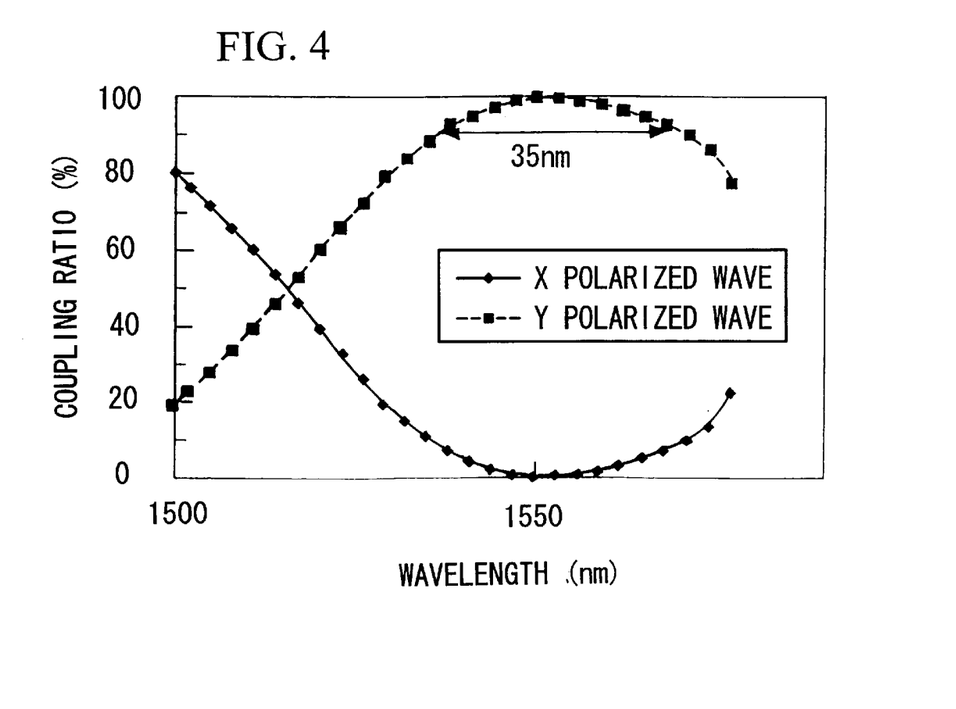
FIG. 4 is a graph depicting the relationship between the wavelength and the coupling ratio of the polarization-maintaining optical fiber coupler according to the second embodiment.

As a result, the second embodiment can also provide a difference between the coupling ratios of the X polarized wave and the Y polarized wave over a wide wavelength band as shown in FIG. 4.

The minimum diameter of the fused-elongated section of this polarization-maintaining optical fiber coupler is 41 μm, the aspect ratio is 1.98 and the elongation length is 24.2 mm.

The characteristics of this polarization-maintaining optical fiber coupler are shown in Table 2 below.

TABLE 2

| | | |
|---|---|---|
| Excess loss | X polarized wave | 0.14 dB |
| (1550 nm) | Y polarized wave | 0.45 dB |
| Coupling ratio | X polarized wave | 99.1% |
| (1550 nm) | Y polarized wave | 1.1% |
| 90% band of X polarized wave | | 35 nm |
| 15% band of Y polarized wave | | 43 nm |

In this example, the wavelength range over which the coupling ratio of the X polarized wave is equal to or greater than 90% and the coupling ratio of the Y polarized wave is equal to or smaller than 10% is 35 nm which is more than triple the conventional range of about 10 nm.

Polarization-maintaining optical fibers suitable for this invention will now be discussed.

Figure 5:
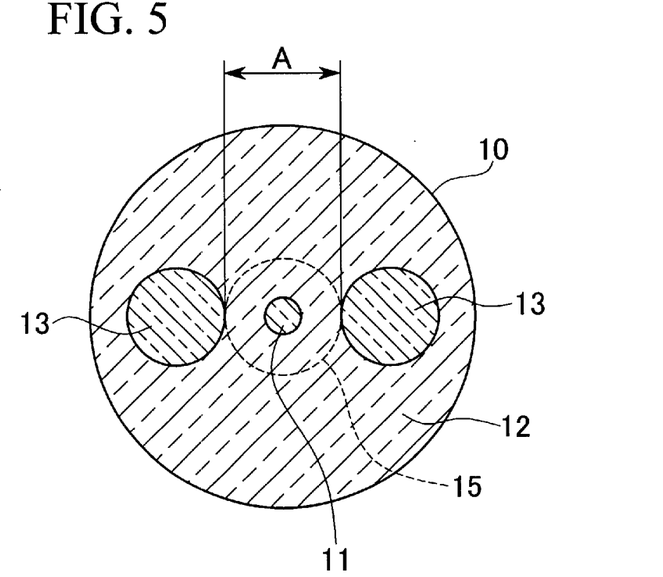
FIG. 5 is a cross-sectional view exemplifying a polarization-maintaining optical fiber suitable for this invention.

FIG. 5 is a cross-sectional view exemplifying a polarization-maintaining optical fiber suitable for this invention. The polarization-maintaining optical fiber of this example is a PANDA fiber.

This PANDA fiber is characterized in that the distance between the stress applying sections 13 is large. This distance is determined based on the diameter A of the largest circle 15 which is concentric to the core 11 or the cladding 12, does not reach the stress applying sections 13 and does not include the stress applying sections 13. The diameter A is equal to or greater than 20 μm, preferably 25 to 30 μm.

In the case where a polarization-maintaining optical fiber coupler as shown in FIG. 13 is constructed using these PANDA fibers 10, even if light leaks out the core 11 at the fused-elongated section 3, most of this light is located between the stress applying sections 13 and does not reach the stress applying sections 13 if the coupler is used at the normal used wavelength. This makes it difficult for the light signal (in a mode for propagation through the core 10: propagation light) to be coupled in high-order mode, so that an increase in excess loss can be suppressed.

With the diameter A being smaller than 20 μm, the excess loss tends to become larger. When the diameter A exceeds 30 μm, the difference between the propagation constant of the X polarized wave and that of the Y polarized wave becomes small. This deteriorates the crosstalk between the X polarized wave and Y polarized wave (polarization crosstalk), which may degrade the retained states of the X polarized wave and Y polarized wave.

Note that the diameter A of polarization-maintaining optical fibers for ordinary communications or the like is about 12 to 17 μm. When the stress applying sections 13 are set apart as mentioned above, by way of contrast, the stress that is applied to the core 11 by the stress applying sections 13 decreases and the birefringent index becomes lower as compared with that of the ordinary polarization-maintaining optical fibers. Further, the crosstalk between the fast axis (Y polarization axis) and the slow axis (X polarization axis), i.e., the X-Y polarization crosstalk, tends to be degraded. Furthermore, the loss may become slightly greater. As the use length of the fibers of the polarization-maintaining optical fiber coupler is short, however, no particular problem will arise in actual use if the conditions for the birefringent index, the crosstalk and the loss of the polarization-maintaining optical fiber itself are relaxed more than those for ordinary polarization-maintaining optical fibers for the use in communications or the like.

Specifically, the birefringent index of polarization-maintaining optical fibers suitable for this invention is in a range of $5 \times 10^{-5}$ to $5 \times 10^{-4}$, whereas the birefringent index of ordinary polarization-maintaining optical fibers for communications or the like is about $5 \times 10^{4}$.

The crosstalk per unit length is equal to or greater than −20 dB/km, and is substantially in a range of −20 dB/km to −10 dB/km. The crosstalk of ordinary polarization-maintaining optical fibers is approximately −25 dB/km.

The loss per unit length is equal to or greater than 1 dB/km. The loss is substantially in a range of 1 to 10 dB/km. By way of contrast, the loss of ordinary polarization-maintaining optical fibers is approximately 0.2 to 0.3 dB/km.

It is preferable that the length of the lead fibers of the polarization-maintaining optical fiber using the instant polarization-maintaining optical fibers be set to 10 m or shorter. The length of the lead fibers is substantially set to 0.5 to 10 m. Note that the "lead fibers" are two polarization-maintaining optical fibers (PANDA fibers) 10 which extend out from both ends of the fused-elongated section 3 to constitute the input/output ports as shown in FIG. 13. The length of the lead fibers is designed so because if the lead fibers are too long, the crosstalk and loss of light signals when passing the polarization-maintaining optical fiber coupler become larger.

The core 11, cladding 12 and stress applying sections 13 are formed of, for example, the same materials as those of the conventional polarization-maintaining optical fiber coupler. The outside diameter of the stress applying section 13, the relative refractive-index difference between the core 11 and the cladding 12 and the relative refractive-index difference between the cladding 12 and the stress applying section 13 are adequately designed according to the desired characteristics. Normally, the mode field diameter of the core 11 is set to about 4 to 10 μm though it varies depending on the diameter of the core and the used wavelength. The outside diameter of the cladding 12 is set to about 125 μm.

Figure 6:
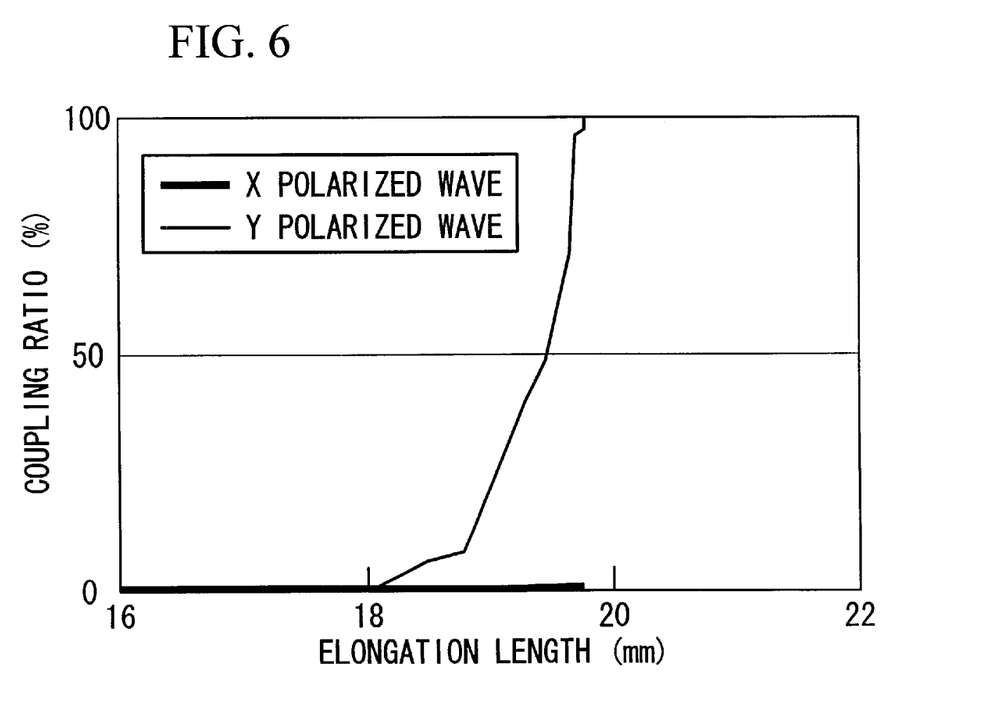
FIG. 6 is a graph showing the relationship between the elongation length and the coupling ratio of a polarization-maintaining optical fiber coupler according to a third embodiment.

FIG. 6 presents a graph showing the relationship between the elongation length at the time of forming a fused-elongated section and the coupling ratio of light with a wavelength of 980 nm (used wavelength) according to the third embodiment.

Figure 7:
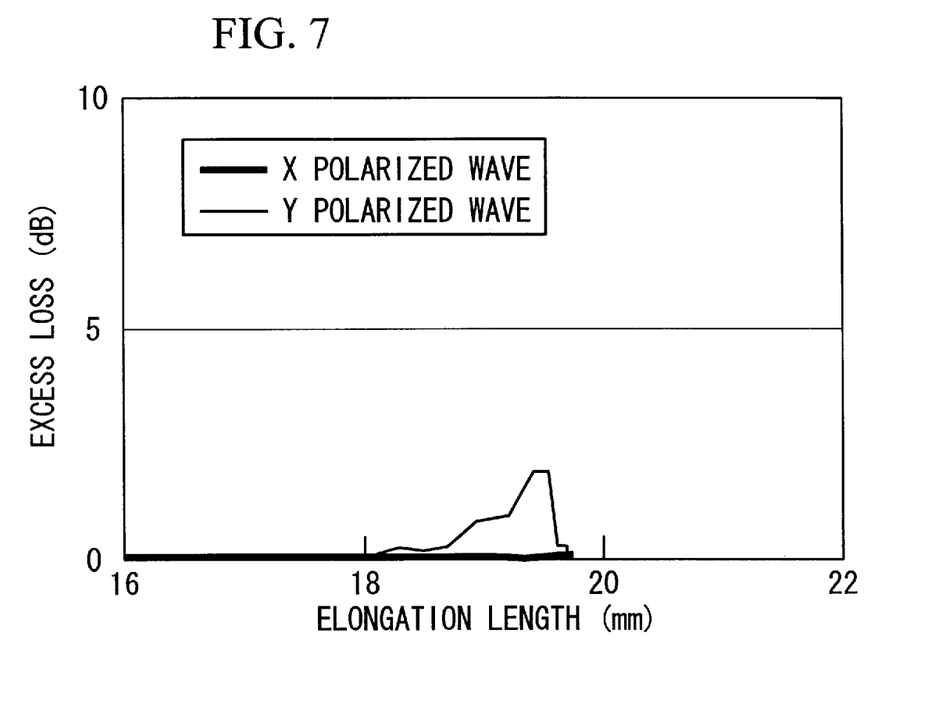
FIG. 7 is a graph depicting the relationship between the elongation length and the excess loss of a polarization-maintaining optical fiber coupler according to the third embodiment.
Figure 8:
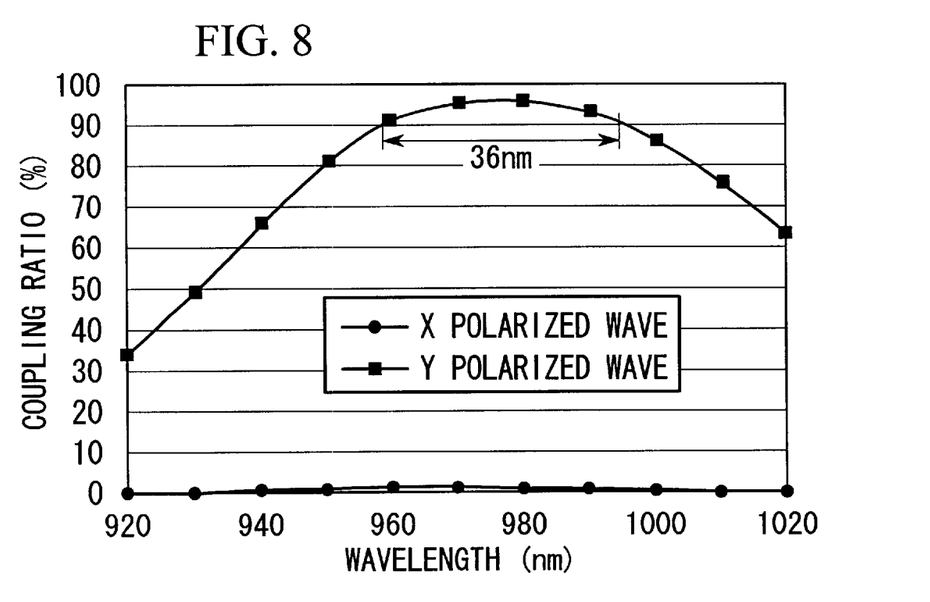
FIG. 8 is a graph showing the relationship between the wavelength and the coupling ratio of the polarization-maintaining optical fiber coupler according to the third embodiment.

According to this embodiment, elongation is stopped for the Y polarized wave at the point in time (½ cycle) when the coupling ratio has reached 100% for the first time after the coupling ratio begins to increase, and elongation is stopped for the X polarized wave at the point in time when the coupling ratio increases very little. FIG. 7 shows changes in the excess losses of the X polarized wave and the Y polarized wave in accordance with an increase in the elongation length. It is apparent that the excess loss of the X polarized wave hardly changes while the excess loss of the Y polarized wave increases once, then decreases to near zero. The point at which the coupling ratio of the Y polarized wave is sufficiently increased coincides with the point at which the excess loss of the Y polarized wave comes close to zero. By stopping elongation at this point, it is possible to realize the characteristics such that the difference between the coupling ratios of the X polarized wave and the Y polarized wave is large and the excess loss is small. This third embodiment can also realize the difference between the coupling ratios of the X polarized wave and the Y polarized wave over a wide wavelength range as shown in FIG. 8.

The minimum diameter of the fused-elongated section is 58 μm, the aspect ratio is 1.92 and the elongation length is 22 mm.

The characteristics of this polarization-maintaining optical fiber coupler are shown in Table 3 below.

TABLE 3

| Excess loss | X polarized wave | 0.10 dB |
|---|---|---|
| (980 nm) | Y polarized wave | 0.38 dB |
| Coupling ratio | X polarized wave | 0.1% |
| (980 nm) | Y polarized wave | 99.6% |
| 90% band of Y polarized wave | | 36 nm |
| 15% band of X polarized wave | | 1200 nm or lower |

Figure 9:
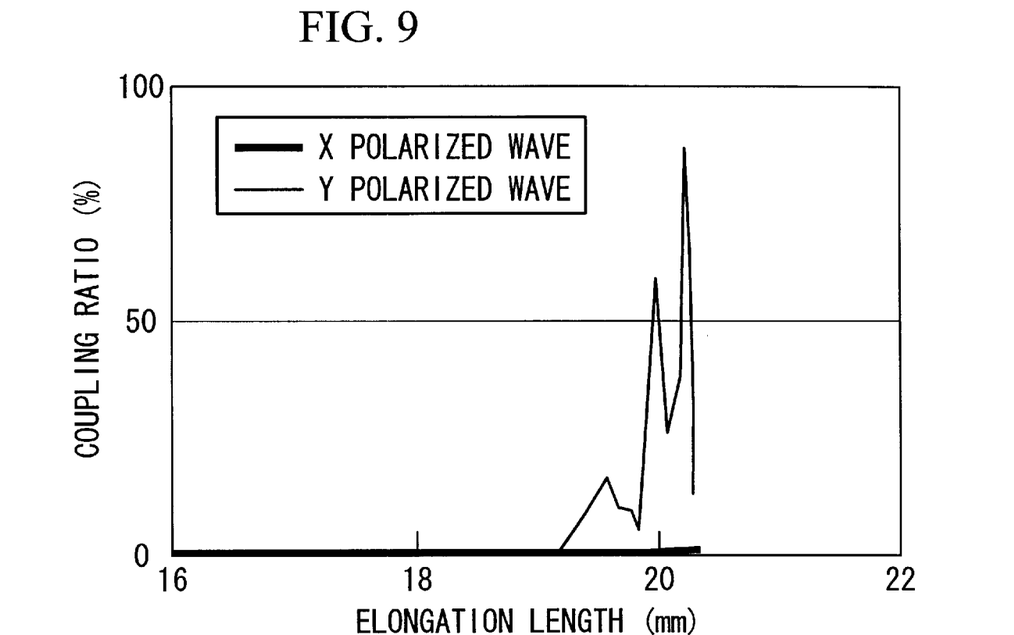
FIG. 9 is a graph showing the relationship between the elongation length and the coupling ratio of a polarization-maintaining optical fiber coupler which uses ordinary PANDA fibers.
Figure 10:
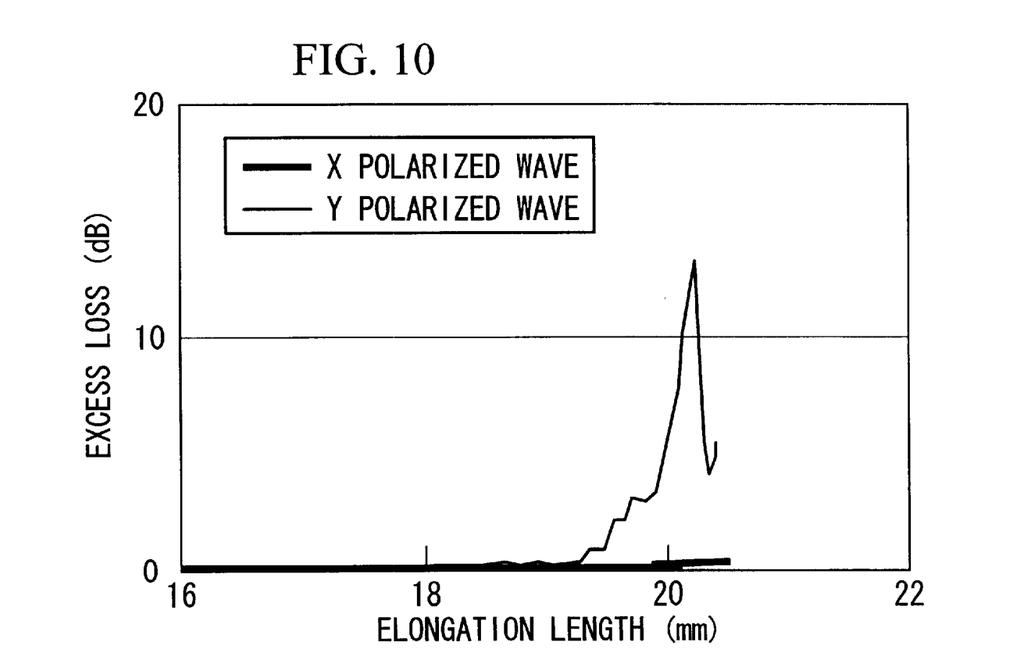
FIG. 10 is a graph showing the relationship between the elongation length and the excess loss of a polarization-maintaining optical fiber coupler which uses ordinary PANDA fibers.

FIG. 9 is a graph showing the relationship between the elongation length at the time a polarization-maintaining optical fiber coupler is manufactured as in the third embodiment using ordinary PANDA fibers with a small diameter A as presented below and the coupling ratio of light with a wavelength of 980 nm (used wavelength). FIG. 10 is a graph showing the relationship between the elongation length and the excess losses of the X polarized wave and Y polarized wave in this example.

(Characteristics of PANDA Fibers)

| | |
|---|---|
| Core diameter | 6.5 µm |
| (core radius) | (3.25 µm) |
| Cladding diameter | 125 µm |
| Relative refractive-index difference between core claddings | 0.35% |
| Outside diameter of stress applying section | 35 µm |
| Distance between centers of stress applying sections | 51 µm |
| Diameter A | 16 µm |
| Used wavelength | 980 nm |
| Mode birefringent index at used wavelength | $5 \times 10^{-4}$ |

As apparent from the comparison of FIG. 6 with FIG. 7, as the elongation length becomes longer, the excess loss of the X polarized wave hardly changes while the excess loss of the Y polarized wave greatly increases, then decreases but increases again before it reaches near zero in FIG. 10. As obvious from FIG. 9, the coupling ratio is influenced by a variation in this excess loss and repeatedly increments and decrements. As the excess loss of the Y polarized wave cannot be made to come close to zero, it is therefore inevitable that the characteristics of the polarization-maintaining optical fiber coupler of this example are inferior to those of the polarization-maintaining optical fiber couplers of the first to third embodiments regardless of under what conditions the elongation is stopped. If the elongation is stopped when the coupling ratio of the Y polarized wave is still large and the excess loss is small, a polarization-maintaining optical fiber coupler which is to some extent practically feasible can be acquired. But, the range of the elongation lengths which satisfies those conditions is narrow and the productivity is often low. Depending on the conditions such as the used wavelength, even the use of ordinary polarization-maintaining optical fibers such as those of this example can provide the advantages of this invention to some degree.

According to this invention, as apparent from the above, in forming the fused-elongated section, a large difference between the coupling ratios of the X polarized wave and Y polarized wave occurs from the point where the coupling ratios start increasing (the point at which optical coupling occurs), and it is possible to realize the preferable range of the coupling ratio for the polarization-maintaining optical fiber coupler when the cyclic changes in the coupling ratio of each polarized wave lies within first two cycles.

In a polarization-maintaining optical fiber coupler which is produced by the manufacturing method of this invention, it is preferable that at the used wavelength, the coupling ratio for one of the polarized waves be equal to or lower than 10%, the coupling ratio for the other polarized wave be equal to or greater than at least 90% and the wavelength band over which those coupling ratios are maintained be equal to or greater than at least 30 nm.

Ensuring such a coupling ratio range can provide the excellent characteristics of a PBS.

Further, the use of polarization-maintaining optical fibers whose diameter A is equal to or greater than 20 µm can provide a polarization-maintaining optical fiber coupler which has a small excess loss.

Those coupling ratio ranges can be set by inputting light of the used wavelength to one of the polarization-maintaining optical fibers at the time of forming the fused-elongated section, monitoring the coupling ratios of the two polarized waves and stopping the work when the desired characteristics are attained, as mentioned above.

As apparent from the graphs shown in FIGS. 2, 4, 6 and 9, a large difference between the coupling ratios of the X polarized wave and Y polarized wave occurs from the point when the coupling ratios start increasing according to this invention. If a difference is provided between the coupling ratios of the X polarized wave and Y polarized wave while the cyclic changes in the coupling ratio of the two polarized waves lies within first two cycles, the elongation length does not become longer and the wavelength band over which the aforementioned coupling ratio range can be kept can be set equal to or greater than 30 nm.

Particularly, the characteristics of a PBS over such a wide wavelength band could not be achieved by the prior art.

If the coupling ratios of the two polarized waves are outside of the aforementioned range, it is difficult to couple and branch the X polarized wave and Y polarized wave. The wavelength band, if narrower than 30 nm, increases the wavelength dependency of the coupling ratios of the polarization, thus limiting the used wavelength.

The used wavelength should preferably lie in a range of 0.6 to 1.7 µm which is the wavelength band where a polarization-maintaining optical fiber coupler is normally used. It is also preferable that the wavelength band should lie within this range.

Although the above-described embodiments use PANDA fibers, this invention is not limited to the use of such a type, but can use other polarization-maintaining optical fibers such as a bow tie fiber, an elliptic jacket fiber as well.

The loss due to the absorption by the stress applying sections 13 becomes preferably small if the portions other than the cladding 12 such as the stress applying sections 13 are not positioned between the cores 11 as much as possible, as indicated by the cross section in FIG. 13. It is most desirable that the two polarization axes be parallel to each other as shown in the cross-sectional view.

As discussed above, this invention can provide a polarization-maintaining optical fiber coupler which has a large polarization dependency of the coupling ratio at a short elongation length. It is therefore effective to prepare a PBS. Further, the short elongation length can improve the mechanical strength.

The loss is small because the number of times the X polarized wave or Y polarized wave is coupled from one polarization-maintaining optical fiber to the other (the number of transfers) can be reduced.

Furthermore, it is possible to provide a polarization-maintaining optical fiber coupler which has a large polarization dependency of the coupling ratio over a wide wavelength band. It is therefore possible to provide a PBS which is effective in preparing an optical circuit, which, for example, receives light of multiple wavelengths and at the same time can carry out polarization demultiplication or polarization multiplication.

The powers $P_A(Z)$ and $P_B(Z)$ of the propagated light, at a positive Z in the lengthwise direction of the two optical fibers in an optical fiber coupler are expressed by the following Equation 1.

$$P_A(Z)=1-F \sin^2(qz)$$

$$P_A(Z)=F \sin^2(qz) \quad (1)$$

where $$F=1/(1+(\delta/\kappa)^2)$$

$q = (\kappa^2 + \delta^2)^{1/2}$ $\kappa$: coupling coefficient $\delta = (\beta_2 - \beta_1)/2$ and $\beta_2$ and $\delta_1$ are propagation constants when it is assumed that two waveguides are isolated.

If the core diameter of one of the two optical fibers and the core-cladding relative refractive-index differences are equal to those of the other optical fiber, $\beta_1 = \beta_2$, $\delta = 0$ and F=1, so that Equation 1 is simplified to Equation 2 below.

$$P_A(Z) = 1 - \sin^2(\kappa Z)$$

$$P_B(Z) = \sin^2(\kappa z) \quad (2)$$

For polarization-maintaining optical fibers, Equation 2 is satisfied for both the X polarized wave and Y polarized wave. At this time, if the coupling coefficient $\kappa$ does not depend on polarization for the polarization direction, the coupling characteristic that depends on polarization cannot be obtained at a predetermined wavelength.

Figure 11A:
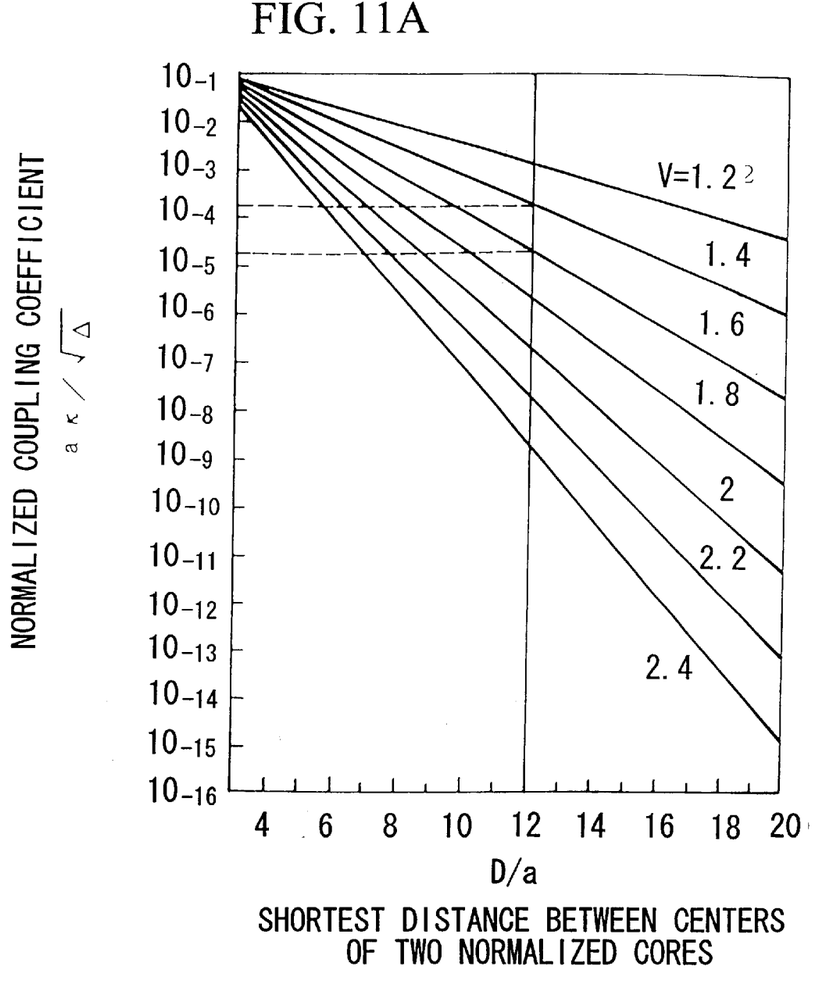
FIG. 11A is a graph illustrating the relationship among the distance between the centers of two cores normalized with the core radius, the normalized coupling coefficient and the normalized frequency.

FIG. 11A presents a graph indicating that $\kappa$ depends on the structure of optical fibers (reference document: "Fundamental of Optical Waveguide" by Katsunari Okamoto, p 151, in Photonics Series by CORONA Publishing Co., Ltd.).

Figure 11B:
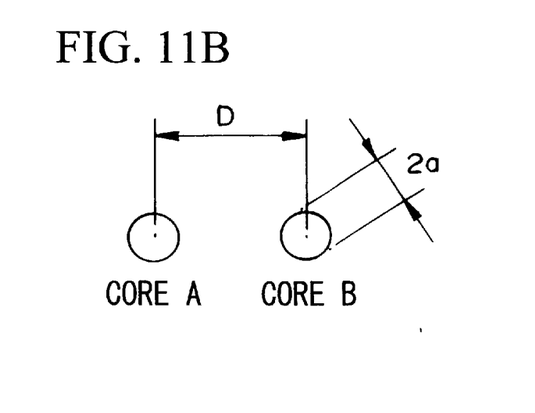
FIG. 11B is an explanatory diagram of the values on the horizontal scale of the graph in FIG. 11A.

As shown in FIG. 11B, "D" in the horizontal scale D/a in the graph is the minimum distance between the centers of two cores A and B at the fused-elongated sections and "a" is the common radius of the cores A and B. The vertical scale in the graph represents the normalized coupling coefficient of light.

"V" in the graph is the normalized frequency of the core of an optical fiber, which is given by the following Equation 3.

$$V = (2\pi/\lambda) a n_1 (2\Delta)^{1/2} \quad (3)$$

where a: the radius of the core $n_1$: the refractive index of the core $\Delta$: core-cladding relative refractive-index difference $\lambda$: wavelength of light $\Delta$ in Equation 3 is given by the following Equation 4.

$$\Delta = (n_1^2 - n_2^2)/(2n_1) \quad (4)$$

where $n_2$ is the refractive index of the cladding.

For the sake of convenience, this graph is for the case where the normal frequencies V of two optical fibers are equal to each other. It is apparent from FIG. 11A that the coupling coefficient $\kappa$ varies greatly according to the normalized frequency V.

The normalized frequency V should take a value that guarantees single-mode propagation for the optical fibers that constitute an optical fiber coupler. For optical fibers having a step type refractive index distribution, the single-mode condition is guaranteed when $V \leq 2.405$ is satisfied. In a polarization-maintaining optical fiber, the single-mode condition is considered for each polarized wave.

In a polarization-maintaining optical fiber coupler, consideration is taken of the coupling of X polarized waves and the coupling of Y polarized waves between two cores. When the polarization axes of two polarization-maintaining optical fibers (PANDA fibers) 10 are parallel to each other, as shown in FIG. 13, it is theoretically unnecessary to consider the coupling of the X polarized wave and Y polarized wave (polarization crosstalk).

It is understood from the graph in FIG. 11A that when the distance between the centers of the cores is large to a certain degree, the difference between the coupling coefficients $\kappa$ becomes larger between the X polarized wave and Y polarized wave if the value of the normalized frequency of the X polarized wave differs from the value of the normalized frequency of the Y polarized wave. For the ordinary polarization-maintaining optical fiber coupler, the optical characteristics of the X polarized wave and Y polarized wave differ from each other slightly but are large enough to distinguish one from the other.

When D/a is 12, the normalized frequency $V_X$ of the X polarized wave is 1.6, and the normalized frequency $V_Y$ of the Y polarized wave is 1.4, for example, the coupling coefficient of the X polarized wave takes a value about 10 times larger than that of the Y polarized wave.

In this case, with respect to the coupling length (the length of the fused-elongated section) which causes $\kappa z$ in Equation 2 for the Y polarized wave to become $\pi/2$, the product of the coupling coefficient $\kappa_Y$ of the Y polarized wave and L becomes $$\kappa_Y \cdot L = \pi/2$$

and the product of the coupling coefficient $\kappa_X$ of the X polarized wave and L becomes $$\kappa_X \cdot L = 0.1 \times (\pi/2).$$

Figure 14B:
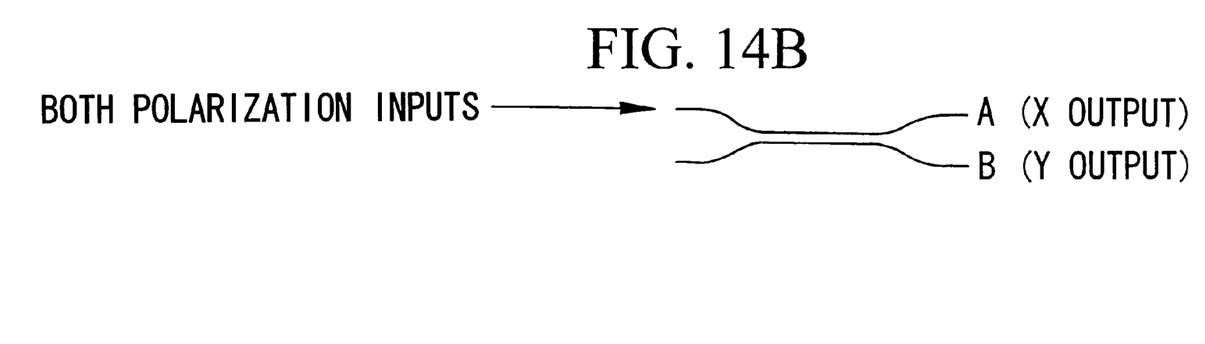
FIG. 14B is an explanatory diagram illustrating the operation of a polarization-maintaining optical fiber coupler.

If the X polarized wave and Y polarized wave are input to the input-side port that is comprised of the same optical fiber as the output-side port A as shown in FIG. 14B, the Y polarized wave is coupled 100% to the port B. The following shows the value of the ratio of the power of the X polarized wave that is output from the port B when the power of the input X polarized wave is taken as 1.

$$P_B = \sin 2(\kappa_X \cdot L) = \sin 2(\pi/20) = 0.024$$

Therefore, 98% of the X polarized wave comes out of the port A while 100% of the Y polarized wave comes out from the port B. This shows the exact characteristics of a PBS.

What is claimed is:

1. A method of manufacturing a polarization-maintaining optical fiber coupler, comprising the steps of:

heating lengthwise portions of two polarization-maintaining optical fibers extending side by side; and elongating said heated portions to thereby form a fused-elongated section, wherein elongation is terminated when cyclic changes in a coupling ratio of two polarized waves according to an elongation length at a wavelength in use are both within first two cycles, wherein a cyclic change is defined as a change in the coupling ratio which starts increasing from 0%, reaches 100% then decreases to 0%, and two cycles are defined as the repetition of one cyclic change twice, so that said coupling ratio of one of said polarized waves is equal to or less than 10% and said coupling ratio of the other one of said polarized waves is equal to or greater than 90%.

2. The method according to claim 1, wherein said fused-elongated section is formed by holding cores of said two polarization-maintaining optical fibers as far apart from each other as possible, thereby increasing a difference between said coupling ratios of said two polarized waves from a point at which optical coupling occurs.

3. The method according to claim 1, wherein a wavelength band that permits said coupling ratio of one of said polarized waves to be kept equal to or less than 10% and said coupling ratio of the other one of said polarized waves to be kept equal to or greater than 90% is equal to or greater than 30 nm.

4. The method according to claim 1, wherein each of said polarization-maintaining optical fibers has stress applying sections arranged symmetrically to each other with respect to a core in a cladding surrounding said core; and the largest one of those concentric circles of said core which do not reach said stress applying sections and do not include said stress applying sections within has a diameter of 20 µm or greater.

5. The method according to claim 4, wherein said diameter is in a range of 25 to 30 µm.

6. The method according to claim 4, wherein said polarization-maintaining optical fibers have a birefringent index of $5 \times 10^{-5}$ to $5 \times 10^{-4}$.

7. The method according to claim 4, wherein a crosstalk of said polarization-maintaining optical fibers is equal to or greater than −20 dB/km.

8. The method according to claim 4, wherein a crosstalk of said polarization maintaining fibers is in a range of −20 to −10 db/km.

9. The method according to claim 4, wherein a loss of said polarization-maintaining optical fibers is equal to or greater than 1 dB/km.

10. The method according to claim 9, wherein said loss of said polarization-maintaining optical fibers is in a range of 1 to 10 dB/km.

11. The method according to claim 4, wherein a lead fiber of said polarization-maintaining optical fiber coupler has a length of 10 m or shorter.

12. The method according to claim 11, wherein said length of said lead fiber of said polarization-maintaining optical fiber coupler is in a range of 0.5 to 10 m.

13. The method according to claim 1, wherein said polarization-maintaining optical fibers are PANDA type polarization-maintaining optical fibers.

* * * * *